Patented May 24, 1938

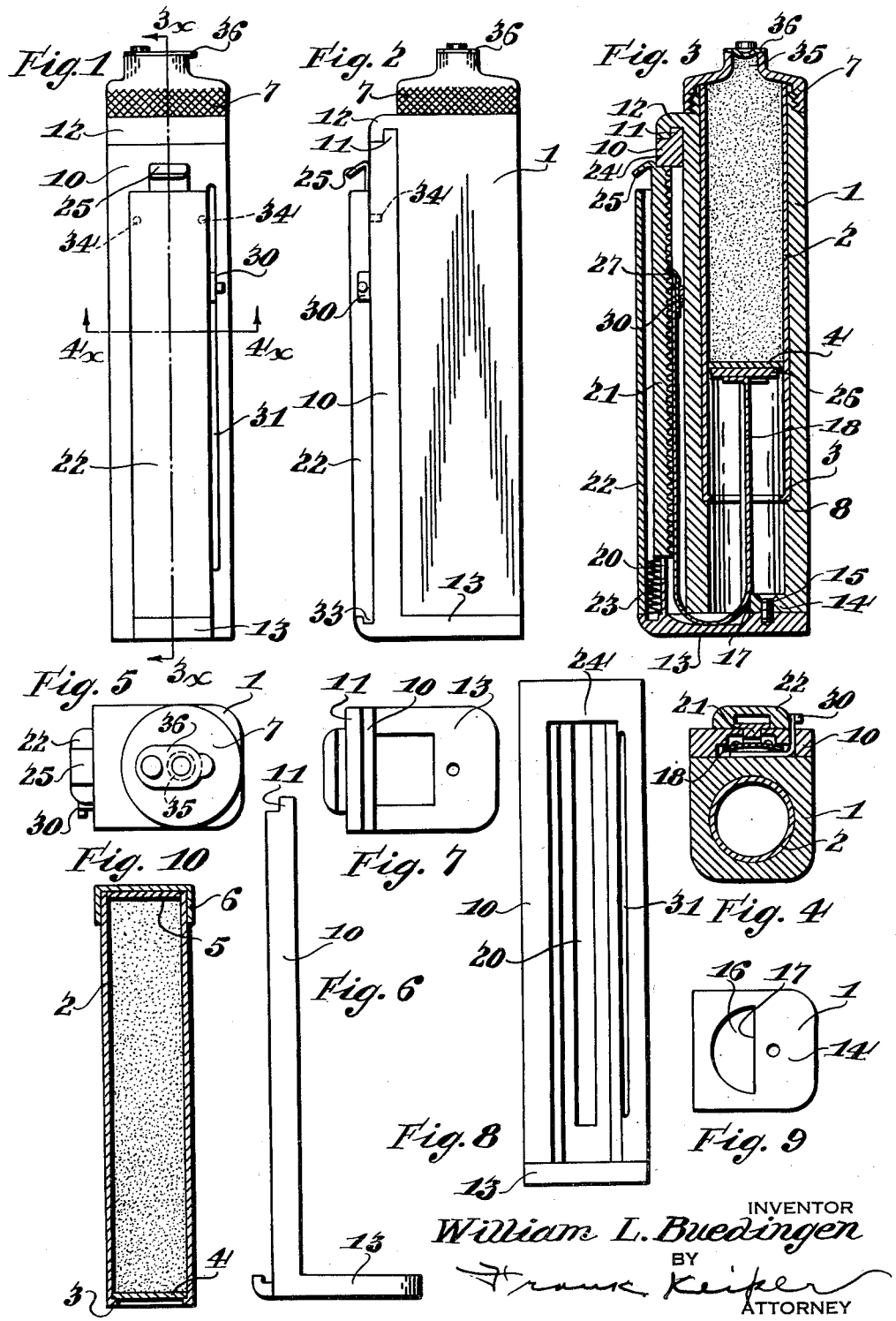

2,118,154

UNITED STATES PATENT OFFICE 2,118,154

DISPENSING DEVICE

William L. Buedingen, Irondequoit, N. Y.

Application December 19, 1934, Serial No. 758,277

10 Claims. (Cl. 221—78)

The object of this invention is to provide a dispensing device that will dispense any material in paste form, such as shaving cream, dental cream, glue, or even other substances.

Another object of the invention is to provide a device that will dispense a measured quantity of the cream for each impulse communicated to it.

Another object of this invention is to provide a dispensing device in which the cream is contained in a hollow tube which maintains its original form throughout, the cream being pushed out of the tube by a piston or plunger that travels inside of the tube.

Another object of the invention is to communicate the impulse to the plunger by means of a flexible metallic tape that is concave in cross-section.

Another object of the invention is to provide for refilling the dispensing device by means of a tube containing the paste or cream, which tube when placed in the dispensing device is closed at its lower end by a movable disc.

These and other objects of the invention will be illustrated in the drawing, described in the specification, and pointed out in the claims at the end thereof.

In the drawing:

Figure 1 is a front elevation of the dispensing device.

Figure 2 is a side elevation of the dispensing device.

Figure 3 is a vertical section through the dispensing device on the line $3x$—$3x$ of Figure 1, looking in the direction of the arrows.

Figure 4 is a transverse section through the dispensing device on the line $4x$—$4x$ of Figure 1, looking in the direction of the arrows.

Figure 5 is a top plan view of the dispensing device.

Figure 6 is a side elevation of the housing, or that portion of the housing that guides the outer end of the tape.

Figure 7 is a top plan view of the housing shown in Figure 6.

Figure 8 is an elevation of the part of the housing shown in Figure 6, looking at it from the right.

Figure 9 is a view of the container shown on the right of Figure 3, looking at it from below after the part shown in Figure 6 is removed.

Figure 10 is a sectional elevation of the cartridge containing the cream or paste that is adapted to be used in the dispensing device.

In the drawing like reference numerals indicate like parts.

In the drawing reference numeral 1 indicates the container in which is placed a tube or cartridge of paste 2, such as is shown separately in Figure 10. This cartridge has a flanged bottom 3, on which is supported a disc 4. The tube is filled with paste, and for the purpose of shipment is closed at the top by a disc 5 and a cap 6. The top of the container is closed by a reducing cap 7 which is threaded thereon. This cap can be removed by unscrewing it, and when removed it uncovers the top of the container and permits the insertion of the cartridge therein such as is shown in Figure 10. The disc 5 and the cap 6 are removed before the reducing cap 7 is screwed back into place. The container 1 has an annular shouldered seat therein 8, on which the lower end of the tube 2 rests. This serves to hold the upper end of the tube slightly above the container, so that the operator can easily take hold of it and pull it out when it is desired to remove it and replace it with a new one.

Fastened to the side of the container is the housing 10 shown in Figure 6. This housing is L-shaped. At the top it has a reduced end or tongue 11 that engages under the lug 12, by which it is held in place at the upper end. The offset portion 13 engages under the bottom 14 of the container, and is fastened thereto by a screw 15, which is put in place when the container is empty and the cap is removed. The bottom 14 of the container is partly cut away to form a semicircular opening 16. The straight edge of this opening forms a guide 17 for the flexible tape 18 that will presently be referred to.

The housing 10 has a slot 20 therein, in which is mounted to slide the rack 21. This rack is T-shaped in cross-section and the back of it is covered by the grooved plate 22. The bottom of this rack rests on a spring 23, by which it is normally held up in the position shown in Figure 3. It can be pushed down about $\frac{7}{8}$ of an inch, and when released the spring will push it up again to the position shown in Figure 3, in which position the top of the rack engages under the cross bar 24 at the top of the housing 10, by which its upward movement is limited. A handle 25 is provided at the top of the rack, by which it may be conveniently pushed down and in.

The steel tape 18 is flexible and is concave in section and is bent to the U shape shown in vertical section in Figure 3. The one end of the tape carries the plunger 26 that engages the disc 4 in the bottom of the tube of paste or cream. The other end of the tape stands up along the rack and moves down with the rack by a step by step motion, as will now be described.

On the upper end of the tape is fastened a clip 27, the end of which is bent out so that it engages with the teeth of the rack. As the rack is pushed in and down by the handle 25, one tooth of this rack will engage with the clip and carry the clip and the tape down with it. When the rack is released the spring 23 pushes the rack up and causes the rack to disengage itself from the clip 27 by moving out therefrom. This step by step movement can be repeated indefinitely until the clip 27 is at the bottom of the rack and the plunger 26 is at the top of the tube 2. The offset portion 13 on the housing 10 is cut away to provide a runway for the flexible tape 18, and the stright edge of the bottom 14 acts as a guide for the tape and deflects it upwardly so that the flexible tape is held in the course shown in section in Figure 3, through which it moves by a step by step movement.

The upper end of the tape is provided with a gauge 30 that extends out through a slot 31 provided in the housing 10, by which the position of the upper end of the tape is indicated at all times. This in turn indicates the position of the plunger 26, and indicates the amount of the paste or cream that is still left in the tube.

By pushing in on this gauge the clip 27 can be disengaged from the rack and can be drawn to its highest position, so that the tape can be given a fresh start, and the plunger 26 can be withdrawn to its lowest position. This is done before a new tube of paste is inserted.

The grooved plate 22 is fastened to the housing 10 by means of a mortised joint 33 at the bottom and by dowel pins 34 at the top.

The reduced end 7 has a small opening 35 therein through which the paste is dispensed. On this reduced end is pivotally mounted a cover plate 36, which can be swung sideways to uncover the opening while the paste is being pressed out, and to close the opening after the paste has been dispensed.

I claim:

1. In a dispensing device, the combination of a hollow container, a plunger adapted to travel along in said container, a flexible tape connected at one end centrally to said plunger, said tape being bent around the end of the container at one side thereof, means for holding the free end of said tape in line with the outside of the container, and means for imparting a step by step movement in one direction to the free end of the tape, thereby causing the other end of the tape with the plunger to move through the container in the opposite direction.

2. In a dispensing device, the combination of a hollow container, a plunger adapted to travel along in said container, a flexible tape connected at one end centrally to said plunger, a housing covering the bottom and one side of the container, said tape being bent around the end of the container at one side thereof and the free end of said tape being held between said housing and the outside of the container, means for imparting a step by step movement in one direction to the free end of the tape, thereby causing the other end of the tape with the plunger to move through the container in the opposite direction.

3. In a dispensing device, the combination of a hollow container, a plunger adapted to travel along in said container, a flexible tape connected at one end centrally to said plunger, a housing covering the bottom and one side of the container, said tape being bent around the end of the container at one side thereof, the free end of said tape being held between said housing and the outside of the container, said housing being grooved along the side thereof and across the bottom thereof to hold the tape and provide a runway therefor, a rack mounted in the housing having a short up and down movement, a clip on the end of the tape adapted to engage with the teeth of the rack and be moved thereby in one direction by a step by step movement, thereby causing the other end of the tape with the plunger to move through the container in the opposite direction.

4. In a dispensing device, the combination of a hollow container having a bottom at one end thereof, said bottom being cut away to form a semicircular opening having a guiding edge on one side thereof, a plunger moving in said container, a steel tape, one end of which is adapted to push said plunger, said guiding edge being adapted to guide said tape at the bottom of the container.

5. In a dispensing device, the combination of a hollow container, a plunger adapted to travel along in said container, a flexible tape connected at one end centrally to said plunger, the free end of said tape being bent around the end of the container at one side thereof, means for holding the free end of said tape in line with the outside of said container, whereby the free end of said tape may be caused to move in one direction on the outside of the container and the other end of said tape may be caused to move in the other direction on the inside of said container, said tape being concave in cross-section.

6. In a dispensing device, the combination of a hollow container having a bottom at one end thereof, said bottom being cut away to form a semicircular opening therein having a guiding edge on one side thereof, a housing covering the bottom and one side of the container, said housing having a groove on the inside of the side and bottom thereof, a plunger adapted to travel along in said container, a flexible tape connected at one end centrally to said plunger, the free end of said tape being bent around the end of the container at one side thereof, the free end of said tape being held in the groove between the housing and the outside of the container and being adapted to travel therein.

7. In a dispensing device, the combination of a hollow container, a plunger adapted to travel along in said container, a housing covering the bottom and one side of the container, said housing being formed with a slot extending lengthwise thereof, a rack mounted in said housing and engaging in said slot, said rack having flanges on each side thereof at the back thereof making it T-shaped in cross-section, said flanges engaging on the outside of said housing and holding the rack in engagement with the slot, a plate fastened on the outside of said housing, said plate having a groove therein in which the back of the rack is adapted to engage, a spring at one end of the housing supporting said rack and permitting a short up and down movement thereof, a flexible tape connected to the plunger at one end and engaging with the rack at the other end whereby the movement of the rack is communicated to the plunger.

8. In a dispensing device, the combination of a hollow container, a plunger adapted to travel along in said container, a flexible tape connected at one end centrally to said plunger, said tape being bent around the end of the container at one side thereof, means for holding the free end of said tape in line with the outside of the container, and means for imparting a step by step movement in one direction to the free end of the tape, thereby causing the other end of the tape with the plunger to move through the container in the opposite direction, a gauge exposed on the free end of said tape by which it may be directly moved in either direction.

9. The combination with a container for the material to be dispensed having a discharge opening in one end thereof and having a stopper in the opposite end thereof movable toward the discharge opening to dispense the contents of the container, of a flexible compression member for moving said stopper including an operator mounted at one side of the container for sliding movement relative to the container in a direction toward said stopper, and means connecting the operator to the stopper for moving the latter toward the discharge opening in the container upon movement of the operator in the opposite direction toward the stopper.

10. In a dispensing device, a casing, a plunger movable axially of the casing within the latter, an operator mounted upon said casing for sliding movement relative thereto in a path substantially parallel to the path of travel of the plunger, a flexible member having the ends extending in the same direction and located within the casing with one end portion engaging the inner side of the casing and connected to the operator and with the opposite end portion located in the axis of the casing and connected to the plunger, and means engaging said member intermediate the ends compelling movement of the end thereof connected to the plunger in a direction opposite to the direction of movement of the opposite end by said operator.

WILLIAM L. BUEDINGEN.